INVENTOR.
Joseph J. Slomer
BY
Murray A. Gleeson
ATTORNEY

Feb. 10, 1959 J. J. SLOMER 2,872,794
FRICTION DISC CLUTCH
Filed Feb. 21, 1956 2 Sheets-Sheet 2
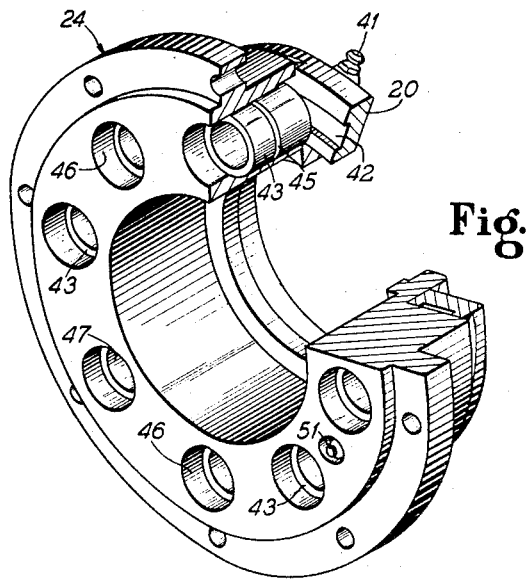
Fig. 2
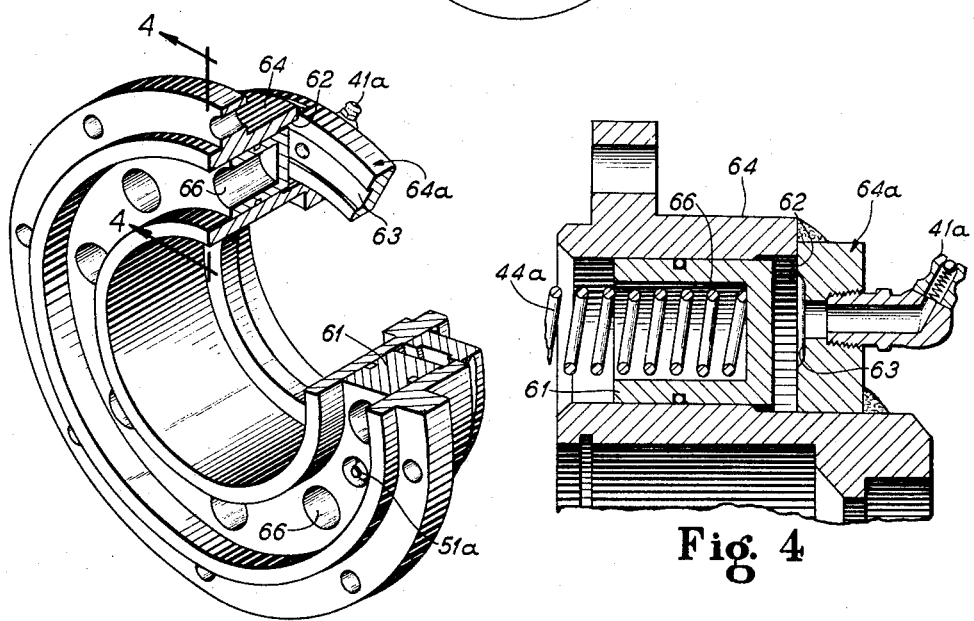
Fig. 3
Fig. 4
INVENTOR.
Joseph J. Slomer
BY
Murray G. Gleeson
ATTORNEY

United States Patent Office 2,872,794
Patented Feb. 10, 1959

2,872,794

FRICTION DISC CLUTCH

Joseph J. Slomer, Chicago, Ill., assignor to Goodman Manufacturing Company, Chicago, Ill., a corporation of Illinois Application February 21, 1956, Serial No. 566,805

2 Claims. (Cl. 64—30)

This invention relates to friction disc clutches of the automatic overload release type in which the disc engaging means is adjustable to change the torque capacity of the clutch.

It is customary in friction disc clutches of the character above described to provide an annular pressure plate which is yieldably urged against the friction discs through a plurality of springs carried on a backing plate. The torque capacity of the clutch is dependent upon the compression of the springs which is varied by a plurality of annularly disposed adjusting screws on the backing plate bearing on the abutments in which the springs are seated.

A major difficulty with the above mentioned type of clutch is that of adjusting the several screws when changing the torque capacity of the clutch. This requires an individual adjustment of the compression of each of the springs, while attempting to maintain a uniform effective compression of all the springs. This is a difficult, tedious and time consuming operation, which must be repeated for every adjustment made on the clutch.

The principal object of the present invention is to provide a simple and efficient fluid pressure means for varying the torque capacity of a disc clutch which acts by simultaneously readjusting the compression of all of the springs an equal amount.

Other objects and advantages of the invention will be seen as the description proceeds.

The invention may be best understood by reference to the accompanying drawings, in which Figure 1 is a longitudinal sectional view of one form of the invention;

Figure 2 is a detail perspective view of the backing plate of the structure shown in Figure 1, with parts broken away to show details of one of the pistons spaced around said plate, each providing a seat for a compressor spring.

Figure 3 is a detail perspective view of a variant form of backing plate in which a single annularly shaped piston is used instead of the plurality of individual pistons as shown in Figure 2; and Figure 4 is an enlarged detail section taken on line 4—4 of Figure 3.

Figure 1:
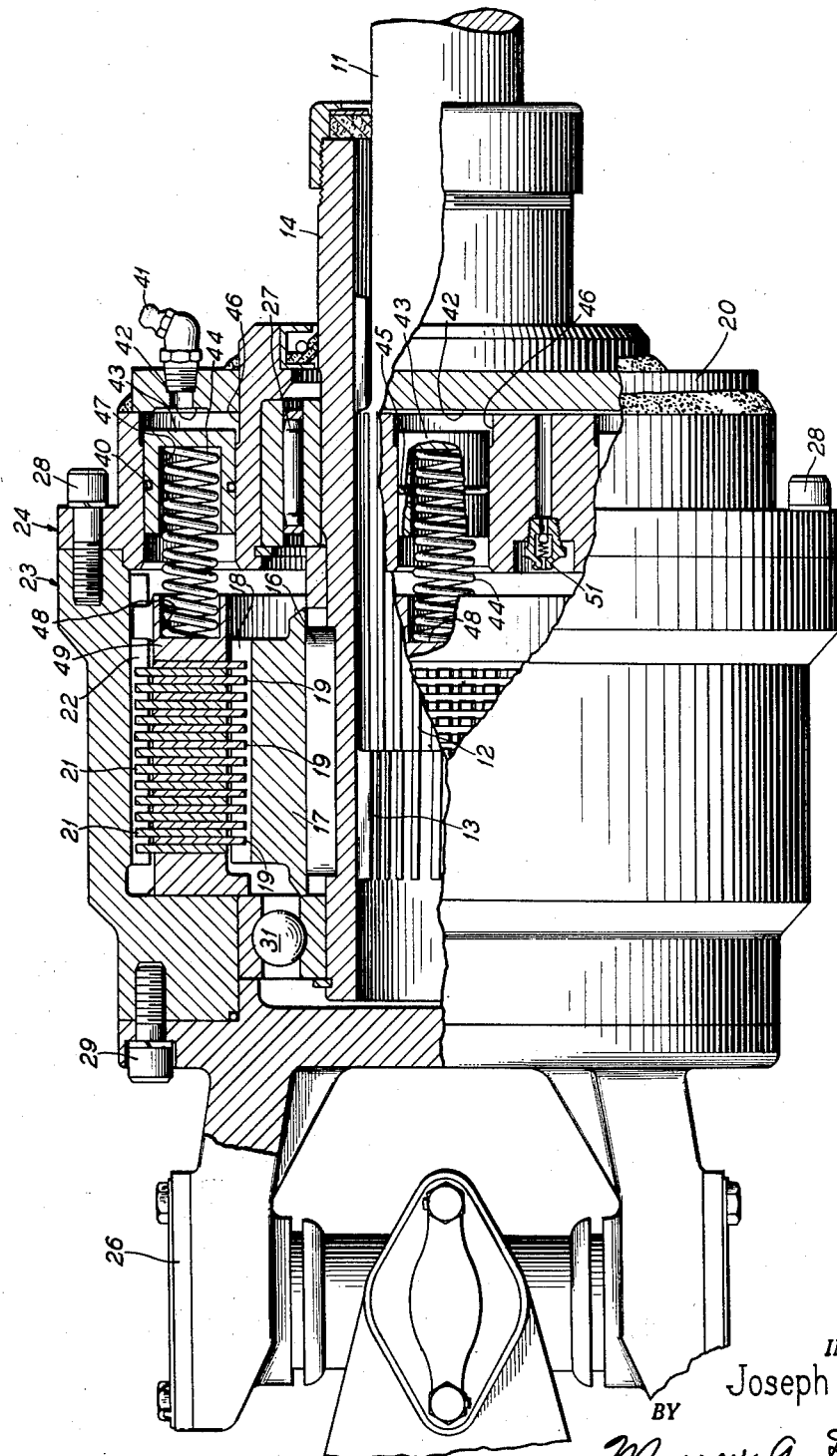

Referring now to details of the embodiment of the invention shown in Figures 1 and 2, a power shaft 11, driven by suitable power means such as an electric motor (not shown), drives a sleeve 14 through splines 12 and 13. The sleeve 14 is keyed at 16 to a clutch hub 17. Clutch discs 19 are toothed as usual for slidable engagement along the exterior of hub 17, and cooperating clutch discs 21 are toothed along the interior of clutch casing 23. The clutch casing has an end plate 24 fixed at one end by screws 28. A universal joint 26 may be fixed at the other end of casing by screws 29. The casing 23 is rotatably mounted on sleeve 14 by bearings 31 and 27.

The clutch discs 19 and 21 are squeezed together by a pressure plate 49 to produce the friction required to transmit the desired torque. The pressure plate 49 is splined in casing 23 and has a plurality of recesses 48 which form seats for the inner ends of clutch springs 44. The outer ends of each spring 44 is seated in a recess 47, in a piston 43. The several pistons 43 are mounted for slidable movement in cylindrical bores 46 formed in spaced circumferential relation about the inner face of the end plate 24 and closed by an annular head 20, which is part of the end plate 24. Each of the pistons 43 has a circumferential groove 40 for an O ring 45.

The outer ends of the several bores 46 open into an annular channel 42 extending around the outer end of the end plate adjacent its head 20. In the form shown herein, the head 20 is attached to the end plate 24 as by welding, preferably after the cylindrical bores 46 and the connecting channel 42 have been finished.

A check valve fitting 41 is mounted on the outer face of the head 20 in communication with the channel 42 for supplying pressurized fluid to the latter. A relief valve 51 may also be connected to the channel 42, herein shown opening into the interior of the casing 23.

Figure 4 shows a variant form of construction in which the plurality of annularly disposed pistons 43 are replaced by a single ring-like piston 61. The piston 61 has a plurality of circumferentially spaced spring seats 66 in which are mounted springs 44a. The end plate 64 has an annular recess 62 in its inner face in which the piston 61 is slidably mounted and an annular groove 63 is formed in the adjacent head 64a of end plate 64 to provide a fluid passageway at the base of the annular recess 62. A check valve fitting 41a communicates with the fluid groove or passageway 63 through which fluid pressure is supplied to the piston 61.

A relief valve 51a communicates with groove 63 through the piston 61. Its function is similar to that of the check valve 51 shown in Figures 1 and 2, namely, to limit the maximum fluid pressure supplied to the groove 63. The check valve fittings 41 and 41a are arranged so that they may bleed out the fluid from channel 42 or groove 63 when it is desired to establish a new pressure lower than the former pressure.

In the operation of both forms of devices shown herein, a pressurized fluid from a "grease gun" or the like is introduced through check valve fitting 41 or 41a while the clutch is not in operation. In the form of Figures 1 and 2, the fluid is effective upon all of the pistons 43, in their bores 46.

In the form of Figures 3 and 4 the fluid is effective on the ring like piston 61. The springs 44 or 44a are thus compressed in equal amounts to exert the desired squeezing action on the stack of discs 19 and 21 through pressure plate 49.

The torque capacity may thus be increased by introducing additional fluid under pressure through the check valve fitting 41 or 41a.

Pressure of the fluid can be accurately determined as usual by observation of a fluid pressure gauge (not shown) which may be associated with the grease gun or the like used to supply fluid to the clutch. By bleeding fluid from the pistons, through the fitting 41, the torque capacity can be reduced when desired.

Although I have shown and described certain embodiments of the invention, it will be understood that various changes and modifications may be made without departing from the spirit and scope of the invention as defined in the appended claims.

I claim:

1. In an adjustable torque limiting clutch, a casing having an interior splined portion, an end plate for said casing, a sleeve rotatably journaled within said casing and end plate and having an externally splined portion associated therewith, a plurality of friction discs alternately splined to the splined portions of said casing and sleeve for transmitting power from one member to the other, an annular pressure plate engageable with the outer of said friction discs, and means loading said pressure plate and discs to slip at preselected torque loads comprising a plurality of circumferentially spaced compression springs seated on said pressure plate, individual pistons loading said springs, a plurality of individual circumferentially spaced bored portions in said end plate defining fluid pressure cylinders for said pistons, an annular fluid pressure passageway having communication with said cylinders adjacent the outer ends thereof, and a check valved grease fitting having communication with said passageway and cylinders, and accommodating a grease gun and the like to supply grease under pressure to said cylinders and uniformly load said springs and friction discs to slip at a preselected torque load.

2. An adjustable torque clutch in accordance with claim 1 in which a relief valve is connected with said annular passageway and opens into the interior of said casing to limit the loading of said springs and friction discs.

References Cited in the file of this patent
UNITED STATES PATENTS

| | | |
|---|---|---|
| 2,702,619 | Andershock | Feb. 22, 1955 |
| 2,715,343 | Youngren et al. | Aug. 16, 1955 |

FOREIGN PATENTS

| | | |
|---|---|---|
| 603,648 | Great Britain | June 21, 1948 |
| 654,453 | Great Britain | June 20, 1951 |